(12) United States Patent
Higgins et al.

(10) Patent No.: US 7,331,763 B2
(45) Date of Patent: Feb. 19, 2008

(54) TURBINE DISK

(75) Inventors: Craig William Higgins, Liberty Township, OH (US); Matthew Lee Krumanaker, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 170 days.

(21) Appl. No.: 11/306,226

(22) Filed: Dec. 20, 2005

(65) Prior Publication Data

US 2007/0140855 A1 Jun. 21, 2007

(51) Int. Cl.
*F01D 25/08* (2006.01)

(52) U.S. Cl. .................. 416/115; 415/199.5; 415/176

(58) Field of Classification Search ............. 415/115, 415/191, 199.5, 211.2
See application file for complete search history.

(56) References Cited

U.S. PATENT DOCUMENTS

| 4,184,797 A | 1/1980 | Anderson et al. | |
| 4,884,950 A * | 12/1989 | Brodell et al. | 416/174 |
| 5,232,335 A * | 8/1993 | Narayana et al. | 415/115 |
| 5,275,534 A | 1/1994 | Cameron et al. | |
| 5,472,313 A | 12/1995 | Quinones et al. | |
| 5,630,703 A | 5/1997 | Hendley et al. | |
| 6,050,079 A * | 4/2000 | Durgin et al. | 60/782 |
| 6,464,453 B2 * | 10/2002 | Toborg et al. | 415/115 |

FOREIGN PATENT DOCUMENTS

| GB | 1345910 | 2/1974 |
| JP | 10121903 A | 5/1998 |
| WO | 9930065 A1 | 6/1999 |

* cited by examiner

*Primary Examiner*—Ninh H. Nguyen
(74) *Attorney, Agent, or Firm*—Adams Intellectual Property Law, P.A.; William Scott Andes, Esq.

(57) ABSTRACT

A gas turbine section of a gas turbine engine, including a first stage turbine disk, a forward outer seal carried on the turbine disk and a forward shaft cooperating with the first stage turbine disk for transmitting torque generated by the turbine section to a compressor section of the engine. The forward shaft intersects the first stage turbine disk at a non-perpendicular angle in the area of the disk hub for directing sufficient hot air against the disk hub to balance the thermal response rate of the disk hub to the thermal expansion rate of the forward outer seal.

10 Claims, 3 Drawing Sheets

Prior Art Forward Shaft

TURBINE DISK

TECHNICAL FIELD AND BACKGROUND OF THE INVENTION

This invention relates to gas turbine engines, and more specifically to the reduction of thermal loading on the forward outer seal and turbine disk of gas turbine aircraft engines. The invention is disclosed and explained in this application with specific reference to a first stage high pressure turbine ("HPT") disk of gas turbine aircraft engines. Standard HPT rotor architecture of some gas turbine engines includes a forward outer seal that is carried entirely by the first stage HPT disk. This architecture has advantages, but one disadvantage is that the disk and forward outer seal are closely mechanically coupled but have different thermal response rates. During takeoff, the forward outer seal, which is very thin with a low mass, responds very quickly to an increase in air temperature, while the first stage disk, being much more massive, responds very slowly. Thus, the forward outer seal attempts to grow out at a relatively high rate in correlation with the increase in temperature, while the first stage disk grows much more slowly. The forward outer seal is therefore restrained from growing at a rate correlated to its increase in temperature, resulting in a thermal mismatch and large, thermally-induced loads on both the forward outer seal and the disk. This can result in low cycle fatigue life predictions for the forward outer seal.

Current practices to reduce or compensate for the thermal mismatch include adjusting the interface gaps between the forward outer seal and first stage disk and otherwise optimizing mechanical features of the forward outer seal in order to obtain acceptable LCF life. However, these practices have reached or neared their practical limits, so that further improvements using these techniques no longer appear likely. This application discloses a way of reducing basic thermal loading on the forward outer seal and first stage disk as a means of extending the LCF life to an acceptable extent.

SUMMARY OF THE INVENTION

According to one aspect of the invention, the position where the first stage forward shaft intersects the first stage HPT disk is altered in order to vary the thermal response rate of the first stage HPT disk.

According to another aspect of the invention, the first stage forward shaft angled to expose the first stage HPT disk to hotter air, thereby reducing the thermal mismatch between the first stage HPT disk and the forward outer seal.

DETAILED DESCRIPTION

Figure 1:
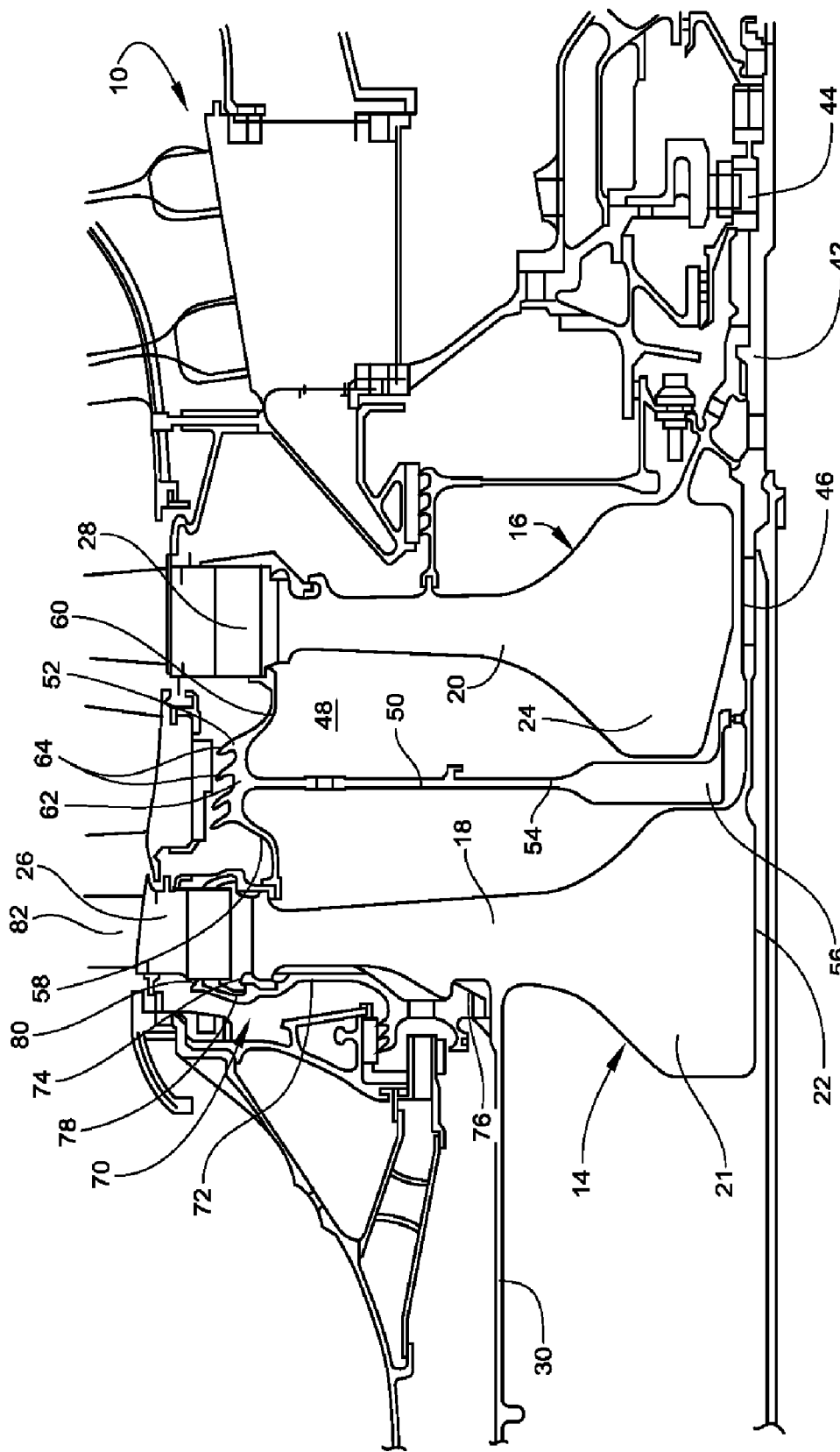
FIG. 1 is a fragmentary cross-section, taken along a longitudinal axis, of the HPT section of a gas turbine engine, showing a prior art forward shaft configuration.
Figure 2:
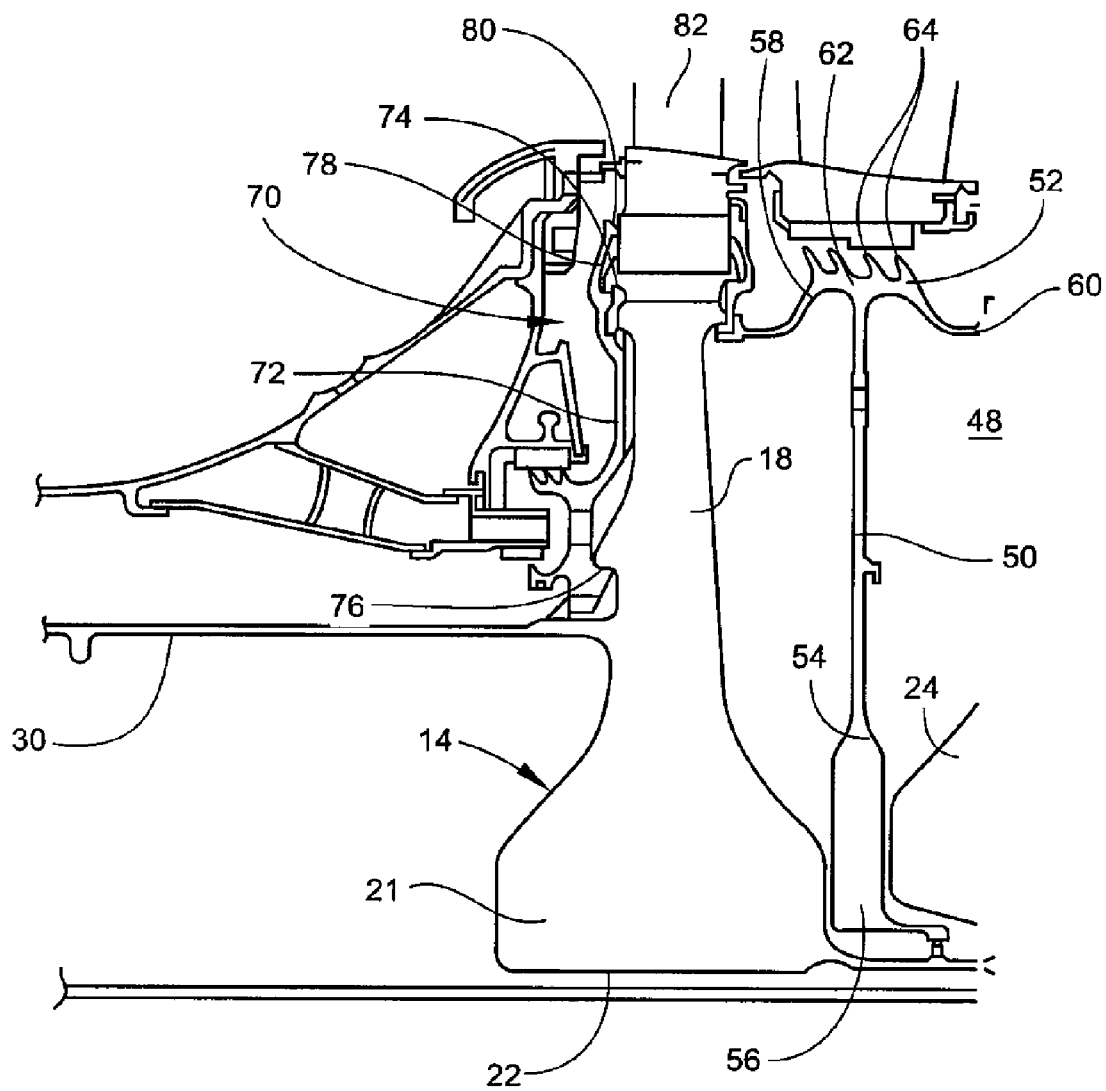
FIG. 2 is an enlarged, partial vertical cross-sectional view of a HPT disk and forward outer seal assembly according to FIG. 1.

Referring now to FIGS. 1 and 2, an overall view of a portion of a HPT section 10 of an aircraft high bypass ratio gas turbine engine is shown. The HPT section 10 includes first and second stage disks 14, 16, having respective webs 18, 20 extending outwardly from respective hubs 21, 24. The first stage disk hub 21 includes a hub surface and a chamfer 23, as described in further detail below. Dovetail slots 26, 28 are formed on the outer ends of the webs 18, 20, respectively.

The first stage disk 14 includes a prior art forward shaft 30 that is integral with the web 18. Note that the forward shaft 30 intersects the first stage disk 14 at an angle perpendicular to the radial axis of the first stage disk 14. Hub 21 of the first stage disk 14 includes a rearwardly-extending aft shaft 42 that is threaded into engagement with a bearing 44. The shaft 42 includes a plurality of openings 46 that allow cooling air to enter the interstage volume 48.

An interstage seal 50 is positioned between the first stage disk 14 and the second stage disk 16, and includes an outer shell 52 and a central disk 54 having a hub 56. Shell 52 is generally cylindrical with forward and aft-extending curved arms 58 and 60 that extend from a mid-portion 62 that supports seal teeth 64 and attach to the respective disks 14, 16.

Turbine section 10 also includes a forward outer seal assembly 70, that includes a faceplate 72 mounted on the first stage disk 14 by a bayonet connection 74 at a radially outer periphery and a bayonet connection 76 at a radial inner periphery. Faceplate 72 includes a blade retaining outer rim 78 that terminates at an axial flange 80 contacting the first stage blade 82.

Figure 3:
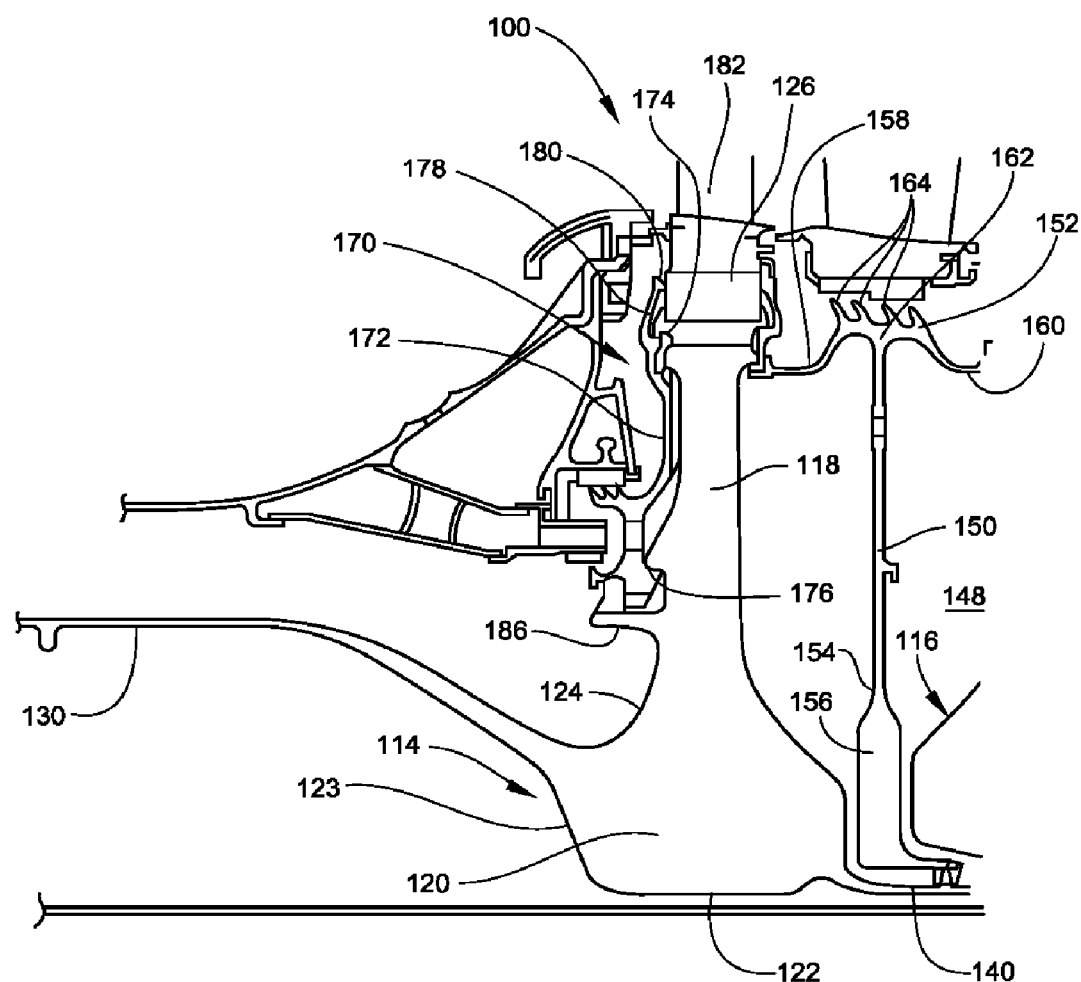
FIG. 3 is a partial vertical cross-sectional view of a HPT disk and forward shaft seal according to one aspect of the invention.

Referring now to FIG. 3, a partial view of a HPT section 100 of a gas turbine engine according to a preferred embodiment of the invention is shown. The HPT section 10 includes first and second stage disks 114, 116. The first stage disk 114 includes a radially-outwardly projecting web 118 and a disk hub 120. The first stage disk hub 120 includes a hub surfaces 122, 123 and 124. A dovetail slot 126 is formed on the outer ends of the webs 118.

The first stage disk 114 includes a forward shaft 130 that is integral with the disk hub 120. Note that the forward shaft 130 intersects the disk hub 120 of the first stage disk 114 at an non-perpendicular angle, and defines an arcuate, non-planar, radially-inwardly extending surface that transitions smoothly into the radial axis of the first stage disk 114. Disk hub 120 of the first stage disk 114 includes a rearwardly-extending aft shaft 140 that is threaded into engagement with a bearing (not shown). An interstage seal 150 is positioned between the first stage disk 114 and the second stage disk 116, and includes an outer shell 152 and a central disk 154 having a hub 156. Shell 152 is generally cylindrical with forward and aft-extending curved arms 158 and 160 that extend from a mid-portion 162 that supports seal teeth 164 and attach to the respective disks 114, 116.

Turbine section 100 also includes a forward outer seal 170, that includes a faceplate 172 mounted on the first stage disk 114 by a bayonet connection 174 at a radially outer periphery and a bayonet connection 176 at a radial inner periphery. Faceplate 172 includes a blade retaining outer rim 178 that terminates at an axial flange 180 contacting the first stage blade 182.

As noted above, the forward shaft 130 is integrally-formed with the first stage disk 114 inwardly towards the disk hub 120 rather than perpendicularly at the disk web 118. The bayonet connection 176 is therefore supported by a forwardly-extending flange 186 integrally-formed on the forward side of the web 118.

Preferably, the forward shaft 130 defines a gradually-curved transition into the first stage disk 114, thereby promoting an increase in swirl that enhances heat transfer to the first stage disk hub surfaces 122, 123 and 124. This feature is illustrated in FIG. 3.

The structure described above permits the thermal response rate of the first stage disk 114 to be optimized and increased in relation to the thermal response rate of the forward outer seal 170, thus more closely matching the rate of thermal expansion of the forward outer seal 170, Lowering the position at which the forward shaft 130 intersects the first stage disk 114 permits much hotter air to directly contact the first stage disk, particularly the disk hub 120, and brings the upper hub surface into proximity with air that is bounded by both the rotor and stator, thereby increasing the air temperature and local flow velocity on the upper hub surface. These effects create a thermal expansion of the first stage disk 114 that more closely matches the thermal expansion of the forward outer seal 170.

It follows that the position at which the forward shaft 130 intersects the first stage disk 114 can be altered as required to balance forward outer seal 170 and first stage disk rim life, hub life, and burst capability.

A gas turbine engine with reduced thermal loading on the forward outer seal and turbine disk and related method are disclosed above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

What is claimed is:

1. A gas turbine section of a gas turbine engine, comprising:
   (a) a first stage turbine disk including an outer periphery for mounting a plurality of blades thereon and an inner periphery defining a disk hub;
   (b) a forward outer seal carried on the turbine disk; and
   (c) a forward shaft cooperating with the first stage turbine disk for transmitting torque generated by the turbine section to a compressor section of the engine, wherein the forward shaft intersects the first stage turbine disk at a non-perpendicular angle in the area of the disk hub for directing sufficient hot air against the disk hub to balance the thermal response rate of the disk hub to the thermal expansion rate of the forward outer seal and wherein the forward shaft extends radially-inwardly from a position axially-forward of the first stage turbine disk to the disk hub.

2. A gas turbine section according to claim 1, wherein the forward shaft is integrally-formed with the first stage turbine disk.

3. A gas turbine section according to claim 1, wherein the first stage turbine disk includes a forwardly-extending flange positioned radially-outwardly from the forward shaft and radially-inwardly from the blades for supporting an inner peripheral end of the forward outer seal.

4. A gas turbine section according to claim 1, wherein the forward shaft defines a radially-inwardly extending curved surface.

5. A gas turbine section according to claim 4, wherein the forward shaft is integrally-formed with the first stage turbine disk.

6. A gas turbine section according to claim 4, wherein the forward shaft extends radially-inwardly from a position axially-forward of the first stage turbine disk to the disk hub.

7. A gas turbine section according to claim 6, wherein the first stage turbine disk includes a forwardly-extending flange positioned radially-outwardly from the forward shaft and radially-inwardly from the blades for supporting an inner peripheral end of the forward outer seal.

8. A method of balancing the thermal response rate of a turbine disk having a forward shaft, an outer periphery for mounting a plurality of blades and an inner periphery defining a disk hub with the thermal response rate of a forward outer seal mounted to the turbine disk proximate the outer periphery thereof, comprising the steps of:
   (a) providing the forward shaft with a first predetermined diameter forward of the turbine disk; and
   (b) providing the forward shaft with a second predetermined diameter at a point of intersection with the turbine disk, the second predetermined diameter being less than the first predetermined diameter for directing sufficient hot air radially inwardly and axially rearwardly towards the disk hub to adjust the thermal expansion of the turbine disk in relation to the thermal expansion of the forward outer seal in order to reduce thermally-induced stress loads on the turbine disk and forward outer seal.

9. A method according to claim 8, wherein the forward shaft defines an inwardly extending arcuate surface.

10. A gas turbine section of a gas turbine engine, comprising:
    (a) a turbine disk including an outer periphery for mounting a plurality of blades thereon and an inner periphery defining a disk hub;
    (b) a forward outer seal carried on the turbine disk; and
    (c) a forward shaft cooperating with the turbine disk for transmitting torque generated by the turbine section to a compressor section of the engine, the forward shaft having a first predetermined diameter forward of the turbine disk and a second predetermined diameter at a point of intersection with the turbine disk, the second predetermined diameter being less than the first predetermined diameter for directing sufficient hot air radially inwardly and axially rearwardly towards the disk hub to adjust the thermal expansion of the turbine disk in relation to the thermal expansion of the forward outer seal in order to reduce thermally-induced stress loads on the turbine disk and forward outer seal.

* * * * *